United States Patent [19]
Worrell

[11] Patent Number: 5,670,900
[45] Date of Patent: Sep. 23, 1997

[54] MASK DECODER CIRCUIT OPTIMIZED FOR DATA PATH

[75] Inventor: Frank Worrell, San Jose, Calif.

[73] Assignee: LSI Logic Corporation, Milpitas, Calif.

[21] Appl. No.: 550,944

[22] Filed: Oct. 31, 1995

[51] Int. Cl.$^6$ ............................................. G06F 9/00
[52] U.S. Cl. ................... 326/105; 395/565; 364/947.4
[58] Field of Search ............................... 326/105–106, 326/108, 101, 21; 364/716, 947.1, 947.4; 395/775, 800, 565

[56] References Cited

U.S. PATENT DOCUMENTS 4,012,722  3/1977  Gajski et al. .................... 395/775
4,064,421  12/1977  Gajski et al. .................... 364/716
5,129,066  7/1992  Schmookler ...................... 395/775

Primary Examiner—Edward P. Westin
Assistant Examiner—Jon Santamauro
Attorney, Agent, or Firm—Townsend and Townsend and Crew LLP; Henry K. Woodward

[57] ABSTRACT

A complex, say, N=5 or greater input terminal, mask decoder circuit which is useful in the design of ALUs in microprocessors is presented. The circuit avoids wiring and uses logic gates to make the connections between the input terminals receiving the control bit signals and the output terminals on which the mask signals are generated. This allows the mask decoder circuit to occupy a minimal amount of space on an integrated circuit.

6 Claims, 4 Drawing Sheets

(SEE FIG. 5B)

(SEE FIG. 5A)

MASK DECODER CIRCUIT OPTIMIZED FOR DATA PATH

BACKGROUND OF THE INVENTION

The present invention is related to the field of integrated circuit design and, more particularly, to the design of a mask decoder circuit useful in an ALU of a microprocessor.

In the ALU (arithmetic-logic-unit) of a microprocessor, masking operations are often performed. The operand bits of one register are logically combined with the masking bits of a second register to produce a desired result. The masking bits of the second register are typically logic 1 bits which are generated by a mask decoder circuit. Upon receiving control bit signals at its input terminals, the mask decoder circuit generates a corresponding number of masking bits on the output terminals of the circuit. For example, if the input signals indicate "5", then five logical 1's are generated at either the leftmost or rightmost output terminals of the decoder circuit.

The mask decoder circuit has an ordered design. Each mask decoder circuit of one complexity, say, a decoder circuit with N input terminals (and $2^N$ output terminals), is formed from the mask decoder circuit of less complexity (a mask decoder circuit of N−1 input terminals). Stated conversely, one can start with a simple mask decoder circuit and create mask decoder circuits of increasing complexity.

Naturally, as the number of input terminals, N, increases with the corresponding number of $2^N$ of output terminals, space occupied by the circuit upon the substrate of the integrated circuit becomes more of a consideration. Heretofore, integrated circuit designers have tried to eliminate circuit elements, such as logic gates in digital circuits, to reduce space. Complex mask decoder circuits have been designed using multiple wire routings from the output of a mask decoder circuit of lower complexity to create a mask decoder circuit of high complexity. Many logic gates are avoided. Rather, wiring is used in the place of logic gates.

In contrast, the present invention avoids conventional wisdom for complex, say, N is five or greater, mask decoder circuits and uses logic gates, rather than wiring, to make the connections between the input terminals receiving the control bit signals and the output terminals on which the mask signals are generated.

SUMMARY OF THE INVENTION

To accomplish these ends, the present invention provides for a mask decoder circuit in an integrated circuit device. The mask decoder circuit has N input terminals and $2^N$ output terminals with N being at least five. The circuit has a plurality of logic gates connected between the input terminals and output terminals to generate mask bits on the output terminals responsive to control bit signals on the input terminals with an unique electrical path formed between each output terminal and the input terminals. This allows the mask decoder circuit to occupy a minimal amount of space once integrated circuit device.

DETAILED DESCRIPTION OF PREFERRED EMBODIMENTS

Figure 1:
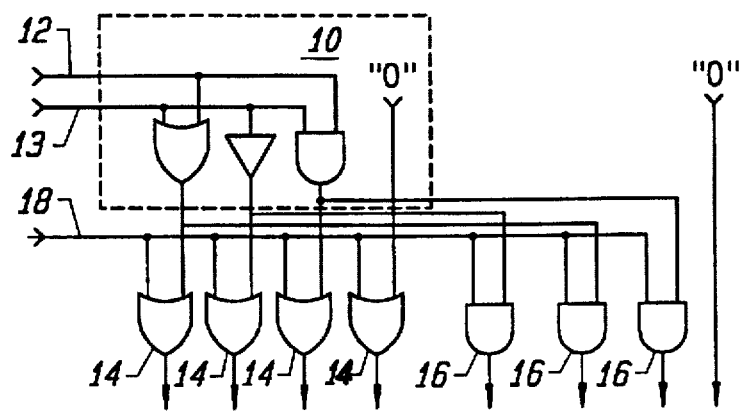
FIG. 1 is a circuit diagram of a three-input mask decoder circuit according to present day practice.

FIG. 1 is a three-input (N=3) mask decoder circuit with eight output terminals by present day design practices. This mask decoder circuit generates masking bits, logic 1 signals, starting from the leftmost output terminal. Thus, if the input terminal 12 has a logic 1, and input terminals 13 and 18 have logic 0 signals, the output signal generated by the circuit represented in FIG. 1 is 10000000. If the input terminals 12, 13 and 18 receive only logic 1's, then the output terminal generates a 11111110 output signal. (The rightmost terminal is always logic 0 since decoder circuit represents eight values, 0 to 7, in decimal.) Likewise, if only logic 0's are sent to the input terminals 12, 13 and 18, then the output signals are 00000000. Thus, a mask decoder circuit is simply a circuit which translates the binary number at the input terminals to a corresponding number of masking bits at the output terminals. As mentioned above, the example here has the masking bits starting from the leftmost output terminal.

Note that the masking circuit of FIG. 1 is composed of one or more masking circuits of lesser complexity. In the mask decoder circuit of FIG. 1, which has three input terminals (N=3), a mask decoder circuit 10 of lesser complexity (N=2) forms a part of the N=3 mask decoder circuit. In the N=2 mask decoding circuit 10, the three output terminals are generated by an OR gate, a simple buffer, and an AND gate (and a degenerate output at logic "0") from left to right in the drawing. This is indicative of a pattern for mask decoder circuits of a greater complexity. Thus, the N=3 mask decoder circuits has OR gates 14 to the left of AND gates 16 on the right of the decoder circuit. Each of the OR gates 14 has one input node connected to one of the output terminals of the N=2 mask decoder circuit 10. Likewise, each of the AND gates 16 have an input node connected to one of the output terminals of the N=2 mask decoder circuit 10. The second input node of each of the OR gates 14 and the AND gates 16 is connected to the third input terminal 18. The rightmost OR gate 15 is, in effect, a simple buffer for the signal on the input terminal 18 since the other terminal of the OR gate 15 is tied to logic "0". Thus N=3 mask decoding circuit has, from left to right, OR gates, a simple buffer, AND gates and a degenerate output at logic "0".

Figure 2:
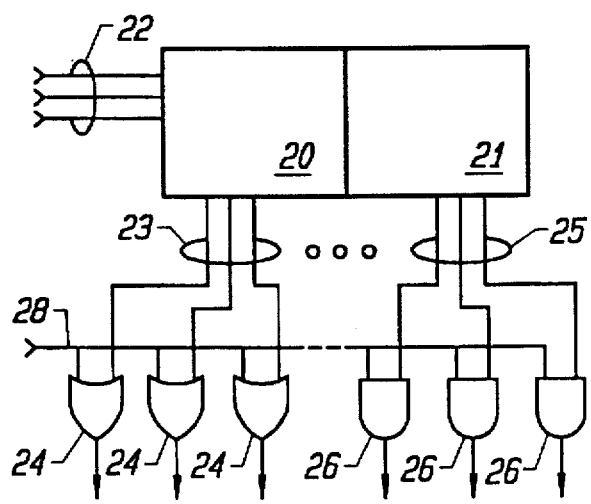
FIG. 2 is a representative diagram illustrating how a mask decoder circuit of N input terminals is composed of mask decoder circuits of lower complexity.

FIG. 1 illustrates a pattern by which mask decoder circuits of greater complexity are constructed from less complex mask decoder circuits. FIG. 2 illustrates the theoretical construction of mask decoder circuits having N input terminals. Two mask decoder circuits of complexity N−1 have N−1 input terminals 22. One N−1 mask decoder circuit 20 has its output terminals 23 connected to the OR gates 24 whose outputs are connected to one-half of the output terminals of the N mask decoder circuit. The second N−1 mask decoder circuit 21 has its output terminals 25 connected to the AND gates 26 whose output terminals form the other half of the output terminals of the N mask decoder circuit. The second input terminal to each of the OR gates 24 and AND gates 26 is connected to the Nth input terminal 28. As explained, this is a theoretical construction of a mask decoder circuit having N input terminals and $2^N$ output terminals. However, it should be noted that the N−1 mask decoder circuits 20 and 21 in FIG. 2 are duplicates of each other.

For complex designs, circuit designers have attempted to eliminate as much circuitry as possible. For simple circuits, such as the mask decoder circuit shown in FIG. 1, the space occupied by the circuit is not a problem. For complex circuits, such as systems having wide 32-bit buses found in present microprocessors, space occupied by such circuits becomes a problem. For a mask decoder circuit, complexity grows exponentially. A mask decoder circuit of N input terminals has $2^N$ output terminals. Thus the problem of space becomes even greater as microprocessors move to 64-bit busses and beyond.

Figure 3:
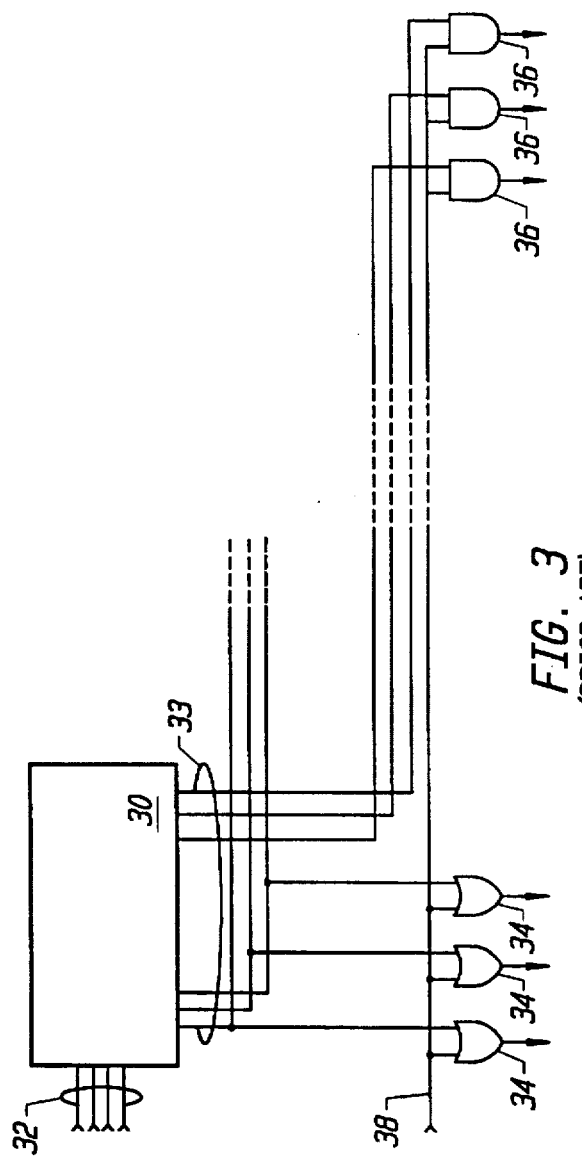
FIG. 3 illustrates a mask decoder circuit with five input terminals according to the prior art.

A five-input terminal mask decoder circuit is a complex circuit with five input terminals and 32 output terminals to match the 32-bit registers and busses in present microprocessors. FIG. 3 illustrates such a mask decoder circuit and a circuit design adapted to minimize logic gates. As shown in FIG. 3, only one four-input mask decoder circuit is used to drive the input terminals of OR gates 34 and AND gates 36 to create a five-input mask decoder circuit. Wiring segments connected to the output terminals 33 of the four-input mask decoder circuit 30 are routed to the input terminals of the OR gates 34 and AND gates 36 whose output terminals form the output terminals of the five-input mask decoder circuit.

Figure 4:
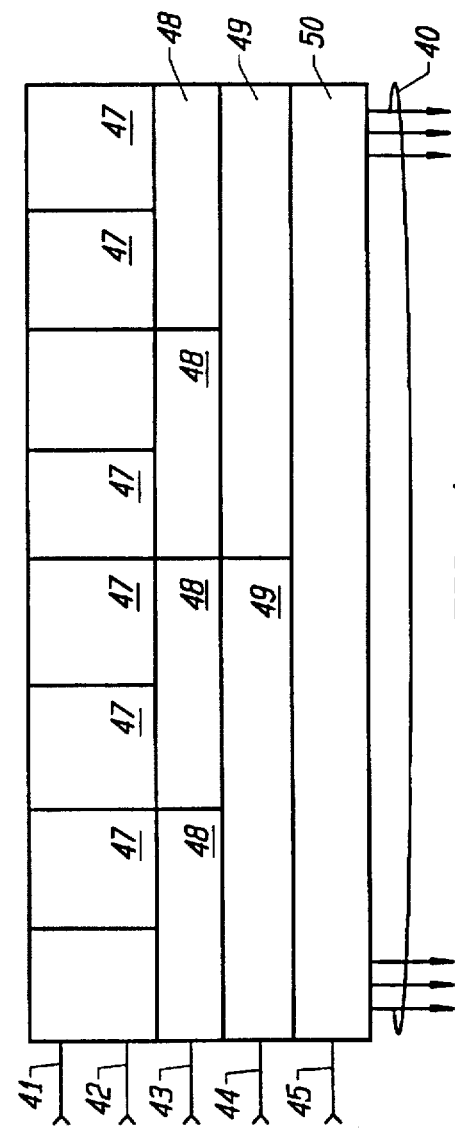
FIG. 4 is a representative block circuit of a mask decoder circuit according to the present invention.

However, according to the present invention this conventional wisdom of minimizing logic gates is not necessarily true for these more complex mask decoder circuits. As the number of data paths (and wiring segments) increase, the layout of the wiring segments occupies even more space than logic circuits in many designs. The routing of wiring becomes a problem in itself. With busses already at 32-bits and increasing to 64 bits, conventional design exacerbates the problem. On the other hand, the present invention minimizes wiring, rather than logic gates. This is represented in FIG. 4 by which a five-input mask decoder circuit having output terminals 40 and five input terminals 41-45. The AND and OR gates whose output terminals represent the output terminals of mask decoder circuits are represented by blocks 47-50. Thus, block 50 represents the AND and OR gates (and buffer circuit) whose output terminals are shown as terminals 40. These logic gates are also connected to the fifth input terminal 45. Likewise, the AND, OR and buffer circuit for the fourth input terminal 44 is shown by the two blocks 49 directly above block 50. Upon each block 49 rests two blocks 48 representing the AND, OR gates and buffer connected to the third input terminal 43, and so forth.

Figure 5A:
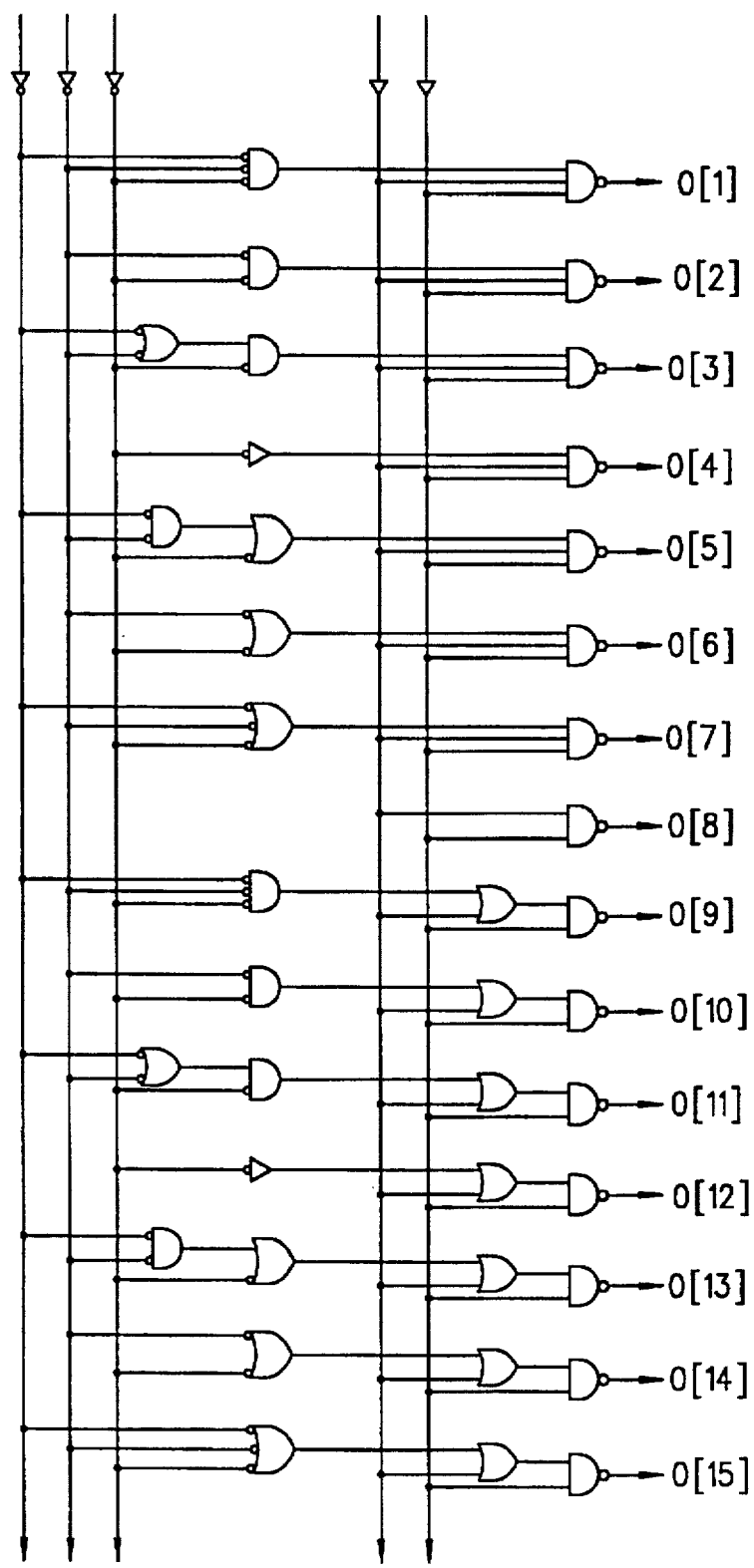
FIGS. 5A and 5B illustrate a mask decoder circuit with five input terminals according to one embodiment of the present invention.
Figure 5B:
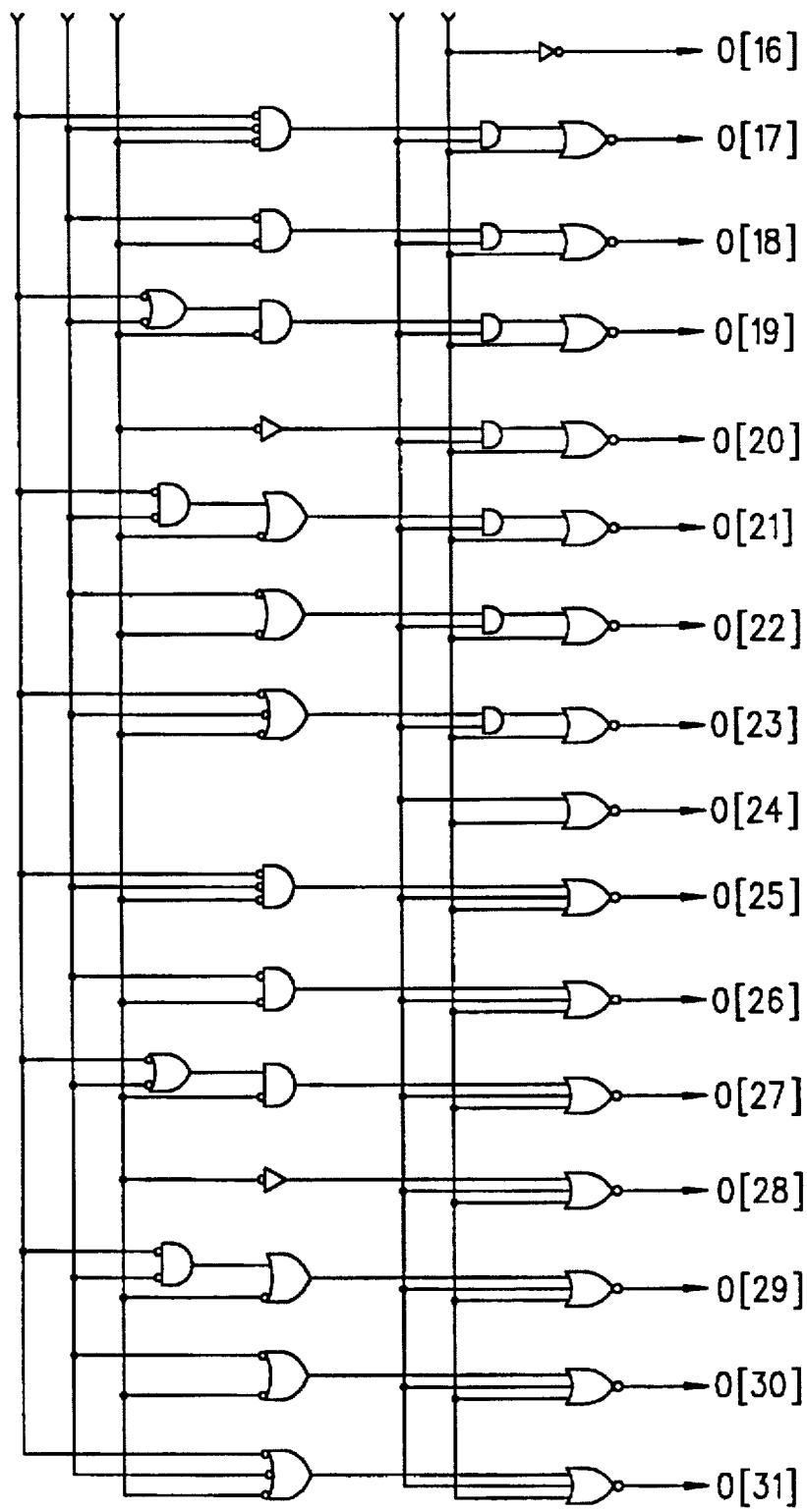

The integrated circuit design for a five-input mask decoder circuit at the logic level is shown in FIGS. 5A and 5B. In this circuit, the masking bits are generated from the left output terminals. That is, the first masking bit for the value 00001 at the input terminals, appears at terminal 0[31]. This is done by merely inverting the logic states at the output terminals. Finally, it should be noted that the circuit in FIGS. 5A and 5B has been modified and changed according to DeMorgan's theorem and other logic circuit concepts well known to integrated circuit designers. In particular, the design shown in FIGS. 5A and 5B merges each logic element into a three-input, one-output logic circuit.

Figure 6:
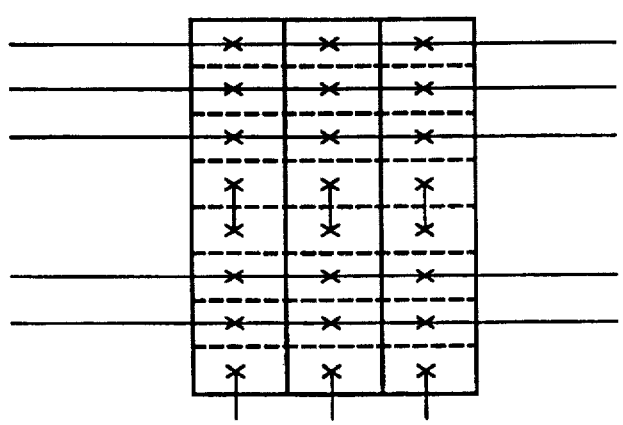
FIG. 6 illustrates the layout of a portion of the mask decoder circuit of FIGS. 5A and 5B with three-input logic gate cells.

The benefit of the three-input, one-output logic cell layout is illustrated in FIG. 6. In the particular application of the FIGS. 5A and 5B circuit, this layout lends to a highly compact design which occupies far less space than if logic cells were minimized.

Thus the present invention is highly suitable for mask decoder circuits having five input terminals or greater. Space is conserved. Additionally, it has been surprisingly found that no operating speed is lost with the logic circuits. It is believed that with wider busses, the wiring segments become disproportionately longer, thus slowing operating speeds. On the other hand, the shorter data paths of the mask decoder circuit according to the present invention more than compensate for the additional loads on the input terminals. As busses become wider, the advantages of the present invention become more manifest.

While the above is a complete description of the preferred embodiments of the present invention, various alternatives, modifications and equivalents may be used. It should be evident that the present invention is equally applicable by making appropriate modifications to the embodiment described above. For example, it should be evident while the mask decoding circuit according to the present invention has been described above in terms of particular logic gates and elements, equivalent circuits may be designed with functionally equivalent gates and elements. Therefore, the above description should not be taken as limiting the scope of invention which is defined by the metes and bounds of the appended claims.

What is claimed is:

1. In an integrated circuit device a mask decoder circuit having N input terminals and $2^N$ output terminals, N being at least five, said mask decoder circuit comprising a plurality of logic gates connected between said input terminals and output terminals to generate mask bits on said output terminals responsive to control bit signals on said input terminals, said logic gates implementing AND, OR, invert and buffer functions with said plurality of logic gates logically comprises a plurality of output logic elements having input nodes and an output node connected to one of said output terminals, one of said input nodes connected to Nth input terminal; and first and second N−1 decoder circuits, each N−1 decoder circuit having N−1 input nodes connected to input terminals, 1 through N−1, and having $2^{N-1}$ output nodes connected to a first half or a second half of said output terminals, each output node of an N−1 decoder circuit connected to a corresponding output terminal of one of said halves of said output terminals, wherein a unique electrical path is formed between each output terminal and said input terminals;

whereby said mask decoder circuit occupies a minimal amount of space on said integrated circuit device.

2. The mask decoder circuit of claim 1 wherein AND and OR logic functions are implemented by three-input, one-output logic gates.

3. The mask decoder circuit of claim 2 wherein said first half comprises substantially all AND logic and said second half comprises substantially all OR logic.

4. In an integrated circuit device a mask decoder circuit having N input terminals and $2^N$ output terminals, said mask decoder circuit comprising a plurality of logic gates connected between said input terminals and output terminals to generate mask bits on said output terminals responsive to control bit signals on said input terminals, said logic gates implementing AND, OR, invert and buffer functions, wherein AND or OR logic functions are implemented by three-input, one-output logic gates;

said plurality of logic gates including a first N−1 mask decoder circuit and a second N−1 mask decoder circuit, each N−1 mask decoder circuit having N−1 input nodes and $2^{N-1}$ output nodes, each output node of said first N−1 decoder circuit connected to one output terminal of a first half of said output terminals, each output node of said second N−1 decoder circuit connected to one output terminal of a second half of said output terminals; wherein each output node of one of said N−1 decoder circuits is connected to an output terminal of one of said halves of said output terminals through a logic function having input nodes and an output node connected to said output terminal, and another of said input nodes connected to an output node of one of said N−1 decoder circuits, whereby said mask decoder circuit occupies a minimal amount of space on said integrated circuit device.

5. The mask decoder circuit of claim 4 wherein N is at least five.

6. The mask decoder circuit of claim 4 wherein said first half comprises substantially all AND functions and said second half comprises substantially all OR functions.

* * * * *